(12) United States Patent
Leopold

(10) Patent No.: US 7,288,023 B2
(45) Date of Patent: Oct. 30, 2007

(54) VENTILATION NOZZLE

(75) Inventor: Gunter Leopold, Baiersbronn (DE)

(73) Assignee: Fischer Automotive Systems GmbH, Horb (DE)

( * ) Notice: Subject to any disclaimer, the term of this patent is extended or adjusted under 35 U.S.C. 154(b) by 19 days.

(21) Appl. No.: 11/108,955

(22) Filed: Apr. 19, 2005

(65) Prior Publication Data

US 2005/0239390 A1    Oct. 27, 2005

(30) Foreign Application Priority Data

Apr. 23, 2004   (DE)   ............. 10 2004 019 755

(51) Int. Cl.
*B60H 1/34* (2006.01)
*B05B 1/32* (2006.01)

(52) U.S. Cl. ................... 454/152; 239/539

(58) Field of Classification Search ............ 454/152; 239/390–395, 34–60
See application file for complete search history.

(56) References Cited

U.S. PATENT DOCUMENTS 4,848,669 A * 7/1989 George ................. 239/539
5,921,860 A * 7/1999 Marsden ............... 454/155
6,589,109 B2   7/2003 Thomassin et al.

FOREIGN PATENT DOCUMENTS

| DE | 1 917 945 | 6/1965 |
|---|---|---|
| DE | 195 11 652 A1 | 10/1995 |
| DE | 198 07 292 A1 | 9/1998 |
| DE | 199 47 208 A1 | 5/2001 |
| DE | 203 13 857 U1 | 12/2003 |
| EP | 1 223 103 A2 | 7/2002 |
| GB | 1 073 405 | 6/1967 |
| WO | 03/082617 A1 | 10/2003 |

\* cited by examiner

*Primary Examiner*—Kenneth Rinehart
*Assistant Examiner*—Helena Kosanovic
(74) *Attorney, Agent, or Firm*—Michael J. Striker

(57) ABSTRACT

A ventilation nozzle for installation in a motor vehicle has a housing, a spherically shaped nozzle head provided with outflow openings, means for rotatably and pivotally mounting the nozzle head in the housing, the mounting means having a spring element.

9 Claims, 2 Drawing Sheets

VENTILATION NOZZLE

CROSS-REFERENCE

The invention described and claimed hereinbelow is also described in DE 10 2004 019 755.5, filed Apr. 23, 2004. This German Patent Application, whose subject matter is incorporated here by reference, provides the basis for a claim of priority of invention under 35 U.S.C. 119 (a)-(d).

BACKGROUND OF THE INVENTION

The invention relates to a ventilation nozzle, especially for installation in a motor vehicle.

The publication DE 203 13 857 U1 discloses a ventilation nozzle having a spherically shaped nozzle head. The nozzle head has a plurality of outflow openings and is rotatably and pivotally mounted in the housing so that the direction of the emerging air current can be controlled. The mounting is achieved by means of a portion of housing which extends around part of the nozzle head in the shape of a band, more than half of the nozzle head being arranged within the housing. As a result of the spherical shape, the housing forms an undercut for the nozzle head, as a result of which it is held in all directions. However, during assembly, the portion of housing in question has to be opened out slightly in order to insert the nozzle head or the nozzle head has to be squashed slightly. As a result thereof and because of production-related inaccuracies it is virtually impossible to ensure that the nozzle head is not mounted either with play or with a great deal of friction. This has the disadvantage, on the one hand, of negative product appeal because there is a threat that the nozzle head either will be loosely mounted and therefore give rise to blowing or rattling noises or will be so tightly mounted that there is high frictional resistance to adjustment.

SUMMARY OF THE INVENTION

Accordingly, it is an object of the present invention to provide a ventilation nozzle, which eliminates the disadvantages of the prior art.

More particularly, it is an object of the present invention to provide a ventilation nozzle, which has an improved mounting.

In keeping with these objects and others which will become apparent hereinafter, one feature of the present invention resides, briefly stated, in a ventilation nozzle that has a spring element which makes it possible for the nozzle head to be mounted with a defined force against a mounting surface which does not have an undercut.

Preferably, the housing provided with an encircling collar serves as an abutment, although a separate part can also be provided. The spring element therein can act in the outflow direction; the collar of the housing then acts as an abutment on the outside of the nozzle head. Alternatively, however, the spring element can also be arranged on the outflow side and a collar located within the housing can act as an abutment.

In principle, instead of a single spring element a plurality of individual spring elements can be arranged in the shape of a ring around the periphery of the nozzle head. Preferably, however, the spring element is in the form of a ring having spring arms, in which case—instead of spring arms—clips, tongues or the like can be integrally arranged on an encircling spring element.

In a preferred embodiment, the nozzle head has a large number of holding depressions on its side remote from the outflow openings, in which depressions the spring arms or the like engage in the open state. This ensures that the nozzle head is held in the particular set position whilst at the same time rotation and pivoting are possible as a result of manual operation.

In principle, three possible methods for closing the ventilation nozzle come into consideration. Firstly, a corresponding valve can be operated by means of a separate operating element, for example an adjustment wheel. Secondly, the nozzle head itself can be used as operating element for the valve, in which case a distinction has to be made between two possible methods according to the degrees of freedom available. On the one hand, opening and closing are possible by means of rotation of the nozzle head about the axis of the main outflow direction; on the other hand, the valve can be accomplished by means of displacement of the nozzle head relative to the housing.

In one embodiment of the invention, therefore, the nozzle head is connected by way of a cardan joint to a valve operable by means of rotation. A very wide variety of constructional forms are suitable as a valve of such a kind, which have in common the fact that the inflow side of the ventilation nozzle has one or more openings which in the closed state is/are covered over by a valve body and in the open state is/are not covered over. The openings therein can be parallel and/or perpendicular to the axis of rotation of the valve.

For closing the ventilation nozzle as a result of displacement of the nozzle head relative to the housing, the ventilation nozzle preferably has an axially acting closure mechanism. This allows the ventilation nozzle to be closed, for example, by pushing on the nozzle head and opened by pulling. Preferably, the valve is so arranged that the nozzle head has a, for example, encircling holding groove, in which the spring element engages in the closed position. Actual closure is achieved by a closing element, the geometry of which corresponds to the inflow opening of the nozzle head, that is to say which is, for example, of partially spherical shape.

In an especially advantageous embodiment, the spring element is simultaneously the closing element so that the ventilation nozzle can be formed from just a few parts.

In order to achieve optimum control of the direction of the air current, the nozzle head has on the outflow side not merely openings but, in addition, air-guiding elements, for example in the form of lamellae or the like.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
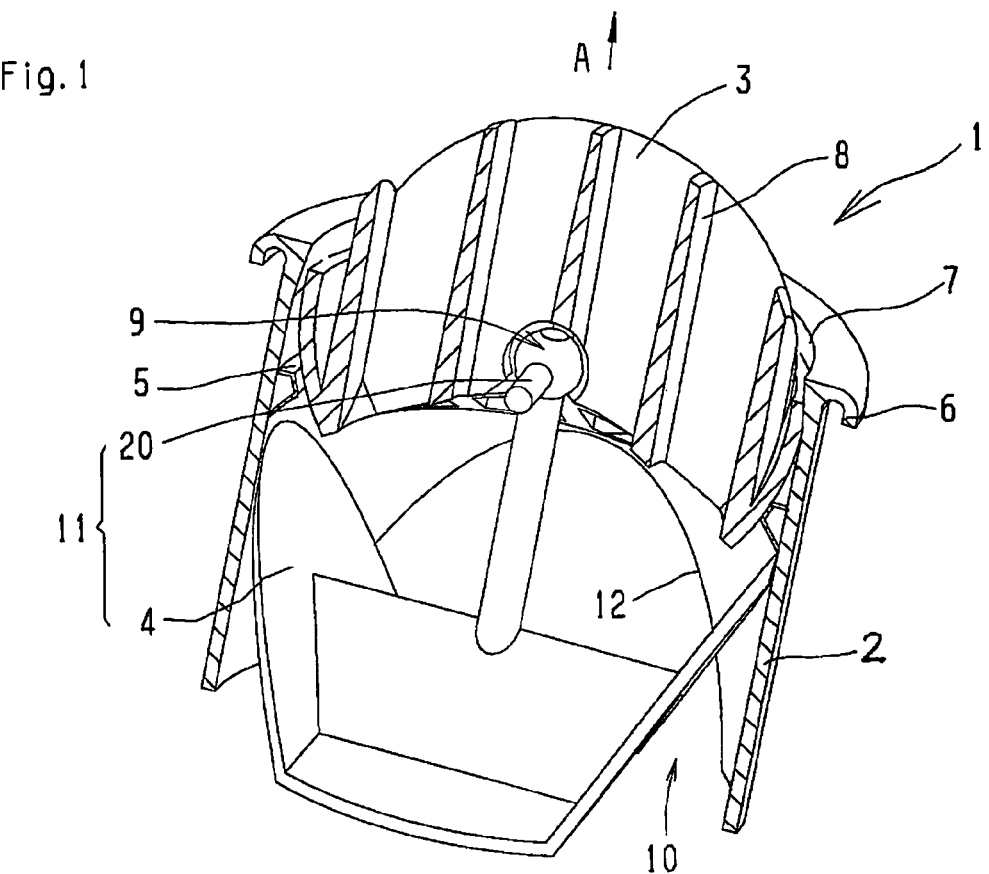
FIG. 1 is a perspective sectional view of a ventilation nozzle according to the invention in the open state.

A ventilation nozzle 1 shown in FIG. 1 is suitable for installation, for example, in a dashboard (not shown) of a vehicle. It consists of a cylindrical housing 2, a spherical nozzle head 3, a closing element 4 and an annular spring element 5 made of sheet metal, only about half of the elements being shown in each case except for the closing element 4. The housing has an encircling flange 6 projecting radially outwards, which serves as a stop and facing trim for installation in the dashboard.

A spherically curved collar 7 projects radially inwards as a stop and seal for the nozzle head 3. The collar 7 acts as an abutment to the spring element 5, which urges the nozzle head 3 axially in the outflow direction A. By virtue of the spherical shape, the nozzle head can be pivoted and rotated in any direction. As a result, the lamelliform air-guiding elements 8 can be oriented and the direction of the air current can be controlled accordingly. When the nozzle head 3 is rotated about the longitudinal axis of the air-guiding elements 8, this rotation acts, by way of the cardan joint 9 together with driver elements 16, on the closing element 4. Together with the inflow side 10 of the housing 2, this forms a valve 11.

Figure 2:
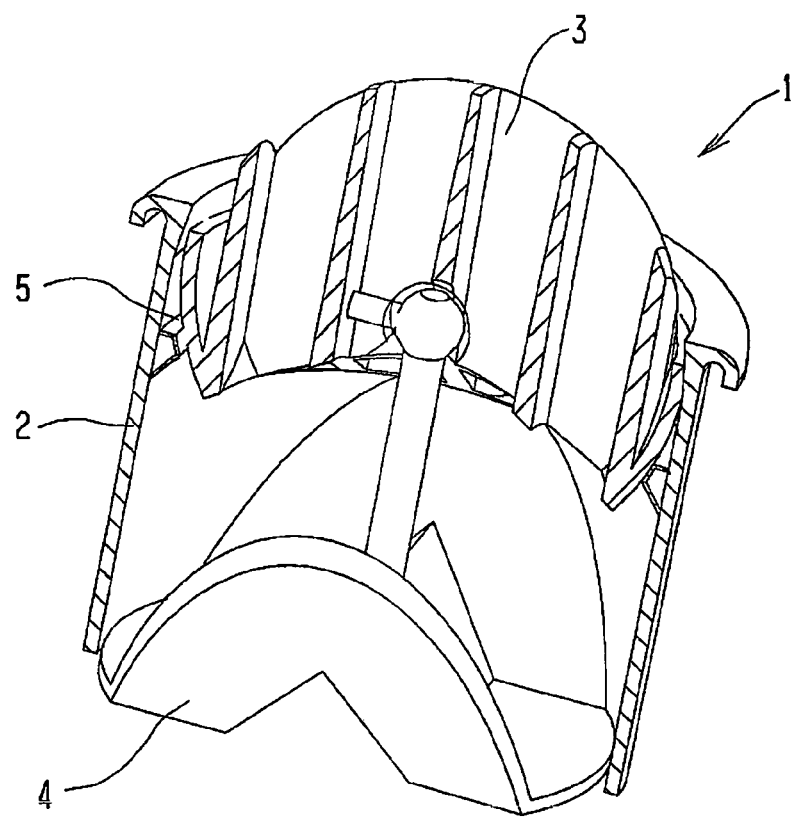
FIG. 2 shows the same ventilation nozzle according to the invention in the closed state.

The inflow side is located either, for example, in a cavity on the inside of a dashboard, in which case a positive pressure exists in the cavity with respect to the passenger compartment of the vehicle or, for example, a ventilation hose is fitted over the inflow side 11 of the ventilation nozzle. As a result of the arcuate holes 12 in the housing 2 and the corresponding surfaces of the closing element 4, the inflow side 11 can be either open (as in FIG. 1) or closed (as in FIG. 2). Because the closing element 4 is snapped into place in the nozzle head 3 for formation of the cardan joint 9 and the nozzle head 3 is held by the spring element 5, the closing element 4 requires no further parts for mounting.

Figure 3:
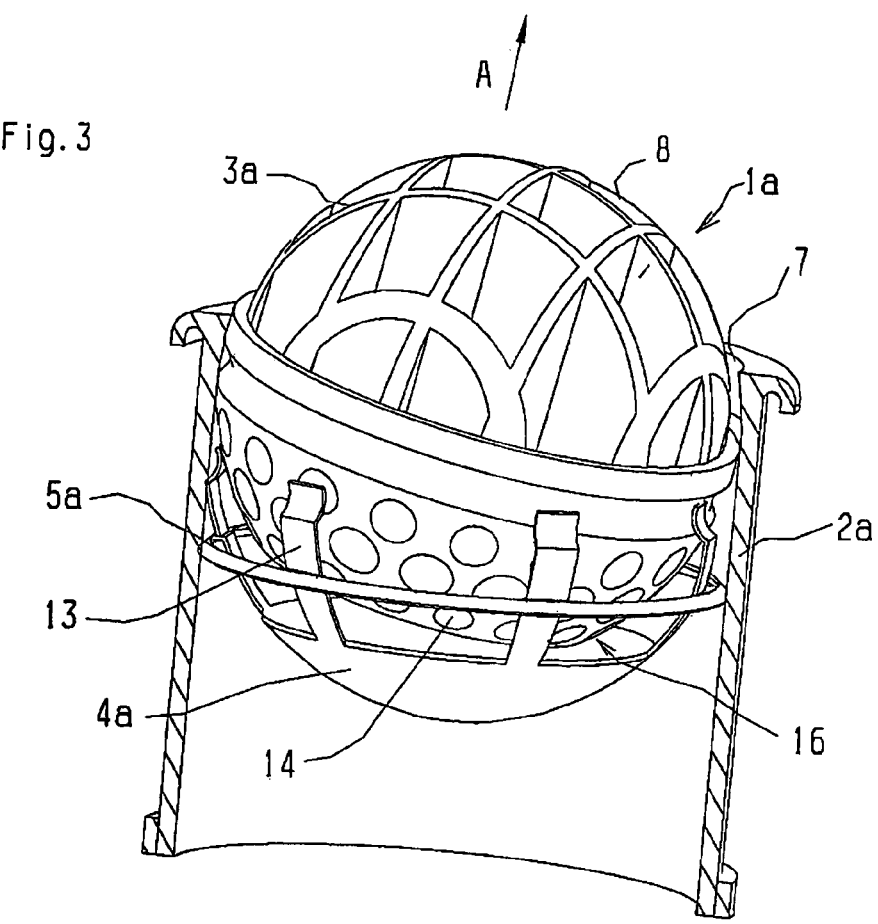
FIG. 3 is a perspective sectional view of a further ventilation nozzle according to the invention in the open state.
Figure 4:
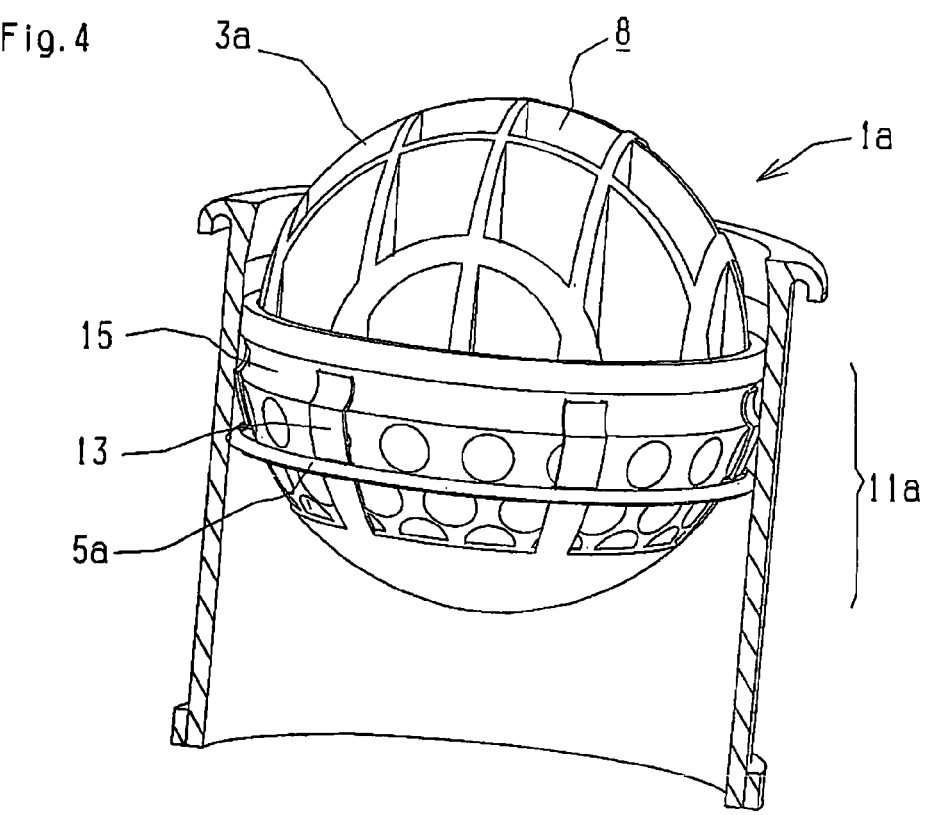
FIG. 4 shows the same ventilation nozzle according to the invention in the closed state.

FIGS. 3 and 4 show an alternative embodiment of the ventilation nozzle 1a in the open (FIG. 3) and closed (FIG. 4) state. In this exemplary embodiment, the main difference is that the spring element 5a and closing element 4a are integral, thereby saving a further component. Opening and closing are performed by pushing in and pulling out the nozzle head 3a in the longitudinal direction of the housing 2a. The spring element 5a has a plurality of spring arms 13, which in the open state urge the nozzle head 3a against the collar 7, which again allows the nozzle head to be pivoted and rotated. As a result of engagement of the spring arms in small holding depressions 14 the particular position is held, resulting in particular convenience in use.

In order to close the ventilation nozzle 1a, the nozzle head 3a is pushed into the housing 2a contrary to the outflow direction A and the air-guiding elements 8 are oriented parallel to the longitudinal direction of the housing 2. As a result, the spring arms 13 engage in a holding groove 15 encircling the nozzle head 3a and hold it in that position.

In this exemplary embodiment, the valve 11a is formed by the closing element 5a and the nozzle head 3a itself. In terms of its shape and size, the spherically shaped closing element 5a corresponds to the inflow opening 16 of the nozzle head 3a and therefore it completely covers that opening in the closed state. For opening, the user can grip between the air-guiding elements 8 and pull the nozzle head out from the holding position.

It will be understood that each of the elements described above, or two or more together, may also find a useful application in other types of constructions differing from the types described above.

While the invention has been illustrated and described as embodied in a ventilation nozzle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A ventilation nozzle for installation in a motor vehicle, comprising a housing; a spherically shaped nozzle head provided with outflow openings rotatably and pivotably mounted in said housing; and a valve, wherein said nozzle head is movable as a whole between an opening position in which it opens the ventilation nozzle and a closing position in which it closes said ventilation nozzle, and said valve is formed such that opening and closing of the ventilation nozzle takes place by movements of the nozzle head as a whole into said opening position and into said closing position correspondingly exclusively by a linear displacement of the nozzle head as a whole relative to the housing between said positions.

2. A ventilation nozzle as defined in claim 1, further comprising a mounting element, wherein the mounting element has a spring element.

3. A ventilation nozzle as defined in claim 2, wherein said housing has a collar which forms an abutment for said spring element.

4. A ventilation nozzle as defined in claim 2, wherein said spring element is configured as a ring having spring arms.

5. A ventilation nozzle as defined in claim 4, wherein said nozzle head has a number of holding depressions, in which said spring arms engage in an open state.

6. A ventilation nozzle as defined in claim 1, wherein said nozzle head has an inflow opening, said valve being formed by a holding groove provided on said nozzle head, in which said spring element engages in a closed position, and by a closing element which corresponds geometrically to an inflow opening of said nozzle head.

7. A ventilation nozzle as defined in claim 5, wherein said spring element and said closing element are integral with one another and together form a one-piece element.

8. A ventilation nozzle as defined in claim 1, wherein said nozzle head has air-guiding elements.

9. A ventilation nozzle as defined in claim 1, wherein said housing has an axis, wherein said valve is formed so that the exclusively linear displacement of the nozzle head as a whole relative to the housing takes place exclusively an axial direction of said housing.

* * * * *